United States Patent
Kim et al.

(10) Patent No.: US 6,885,631 B1
(45) Date of Patent: Apr. 26, 2005

(54) CONNECTION MANAGEMENT METHOD FOR DIGITAL INTERFACE

(75) Inventors: Do-hyoung Kim, Kyungki-do (KR); Goan-soo Seong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 800 days.

(21) Appl. No.: 09/605,735

(22) Filed: Jun. 29, 2000

(30) Foreign Application Priority Data

Jul. 1, 1999 (KR) .......................... 99-26345

(51) Int. Cl.⁷ ............................. G06F 13/38
(52) U.S. Cl. .................................. 370/216
(58) Field of Search ................ 370/254, 255, 370/401, 407, 84, 251, 216, 217, 218, 221, 222, 223, 224; 710/129; 371/20.1

(56) References Cited

U.S. PATENT DOCUMENTS

| | | | | |
|---|---|---|---|---|
| 5,535,208 A | * | 7/1996 | Kawakami et al. | 370/84 |
| 5,923,673 A | * | 7/1999 | Henrikson | 371/20.1 |
| 6,011,781 A | * | 1/2000 | Bell | 370/254 |
| 6,122,248 A | * | 9/2000 | Murakoshi et al. | 370/216 |
| 6,160,796 A | * | 12/2000 | Zou | 370/257 |
| 6,295,571 B1 | * | 9/2001 | Scardamalia et al. | 710/129 |
| 6,298,406 B1 | * | 10/2001 | Smyers | 710/129 |
| 6,452,935 B1 | * | 9/2002 | Gibbs | 370/439 |
| 2003/0172201 A1 | * | 9/2003 | Hatae et al. | 710/8 |

FOREIGN PATENT DOCUMENTS

| | | | |
|---|---|---|---|
| EP | 0 930 747 A1 | 7/1999 | H04L/12/24 |
| EP | 0 994 421 A2 | 4/2000 | G06F/13/42 |
| WO | 00/70830 | 11/2000 | H04L/12/28 |

* cited by examiner

*Primary Examiner*—Chi Pham
*Assistant Examiner*—Derrick W Ferris
(74) *Attorney, Agent, or Firm*—Sughrue Mion, PLLC

(57) ABSTRACT

A connection management method between digital devices connected through a digital interface such as IEEE1394 is provided. According to the method, it is checked as to whether or not the digital device, which establishes a point-to-point connection, is one of two devices connected by the point-to-point connection and when the result of the checking indicates that the digital device, which manages the point-to-point connection, is not one of the two devices connected by the point-to-point connection, another point-to-point connection is established for the two connected devices. According to the method, the stability of the connection between devices is enhanced, and particularly, the point-to-point connection between the devices can be stably restored after a bus reset occurs.

16 Claims, 3 Drawing Sheets

CONNECTION MANAGEMENT METHOD FOR DIGITAL INTERFACE

BACKGROUND OF THE INVENTION

1. Field of the Invention

The present invention relates to a method for connecting a digital interface, and more particularly, to a method for connection management among digital devices connected through a digital interface such as IEEE1394.

2. Description of the Related Art

There have been developed various digital devices such as digital TVs, digital VCRs, digital set-top boxes, and so on. Standards such as IEEE1394 for interfacing these digital devices have been introduced. The IEEE1394 standard is disclosed in "IEEE1394-1995: Standard for a High Performance Serial Bus, (IEEE1394 Standard Press, December 1995)".

In addition, in systems connected to each other via a digital interface such as IEEE1394, connection of isochronous bit streams among digital devices is managed by the IEC61883 specification. The IEC61883 specification is disclosed in "Specification of Digital Interface for Electronic Audio/Video Equipment, (Part 1, December 1995, HD Digital VCR Conference," and so on.

The IEC61883 specification defines an input plug and an output plug as means for inputting and outputting a bit stream in each digital device. The input plug is controlled by an input master plug register (iMPR) and an input plug control register (iPCR). The output plug is controlled by an output master plug register (oMPR) and an output plug control register (oPCR). The connection of each digital device is managed by controlling the registers related to the input plug and the output plug.

Two types of connection between digital devices include a point-to-point connection and a broadcast connection. In the point-to-point connection, which is formed by an output plug, an input plug, and a channel between these plugs, any digital device can establish/overlay a connection. The device that established the connection takes charge of all the management of the connection and by using this device only, changing, freeing, and particularly restoration of the connection after bus resetting can be performed.

FIG. 1 illustrates a method for establishing a point-to-point connection, wherein a first device 110, a second device 120, and a third device 130 are connected via an IEEE1394 bus. Here, when a point-to-point connection is established between the second device 120 and the third device 130, the first device 110 accesses the iPCR (or the oPCR) of the second device 120 and the iPCR (or the oPCR) of the third device 130. Then, the first device 110 establishes a point-to-point connection (the arrows with dotted line) by writing appropriate values to the registers of the second device 120 and the third device 130, and remains as a connection manager for this connection.

However, when a reset occurs on the IEEE1394 bus after the first device 110 establishes a point-to-point connection between the second device 120 and the third device 130, or when the first device 110 cannot normally operate temporarily or permanently on the bus system, or when the first device 110 is separated from the connection and becomes unable to operate, the point-to-point connection between the second device 120 and the third device 130 cannot be restored. Referring to FIGS. 2A and 2B for example, when the first device 110 is separated from the IEEE1394 bus and a bus reset occurs, the existing point-to-point connection between the second device 120 and the third device 130 cannot be restored permanently, because the connection is originally to be restored by the first device 110 and the first device 110 is currently separated from the bus.

Therefore, when the first device 110 establishes a point-to-point connection between the second device 120 and the third device 130 as shown in FIGS. 1 through 2B, the second device 120 and the third device 130 depend on another device for their connection, and when the first device 110 does not operate normally or operates in an undesired way, it can be impossible to connect the two devices.

SUMMARY OF THE INVENTION

To solve the above problems, it is an objective of the present invention to provide a connection management method for use on a digital interface, in which the stability of a connection is enhanced by overlaying a point-to-point connection between two connected devices when another device establishes a point-to-point connection between the two digital devices, and the point-to-point connection between the devices is stably restored particularly after a bus reset occurs.

To accomplish the above object of the present invention, there is provided a connection management method for connecting a digital device, which can be connected to a plurality of digital devices through a digital interface, to another digital device, the connection management method having the steps of (a) detecting a point-to-point connection being established to another digital device; (b) checking whether or not the digital device, which establishes the point-to-point connection in the step (a), is the other digital device to be connected by the point-to-point connection; and (c) establishing another point-to-point connection to the other digital device, when the result of the step (b) indicates that the digital device, which establishes the point-to-point connection, is not the other digital device to be connected by the point-to-point connection.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings.

The embodiments of the present invention are provided in order to more completely explain the present invention to anyone skilled in the art.

FIGS. 3 through 6 illustrate a process in which connection of a digital interface connection is performed according to the present invention.

Figure 1:
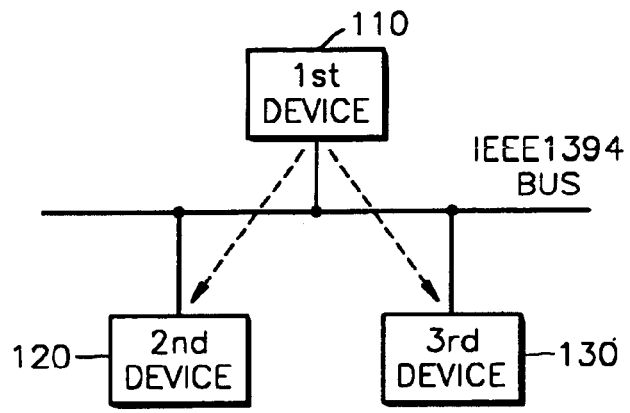
FIG. 1 illustrates a previous method for establishing a point-to-point connection.
Figure 2A:
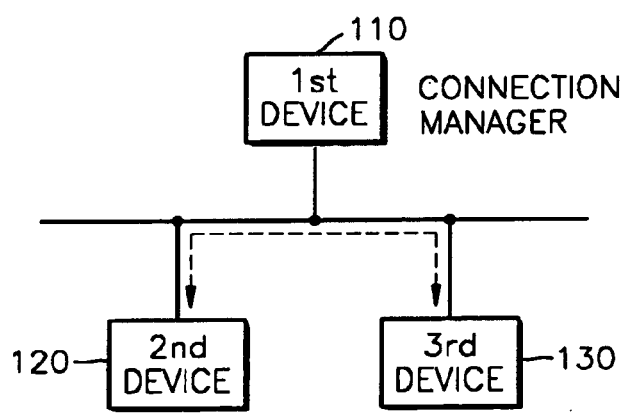
FIG. 2A illustrates a previous method for establishing a point-to-point connection.
Figure 2B:
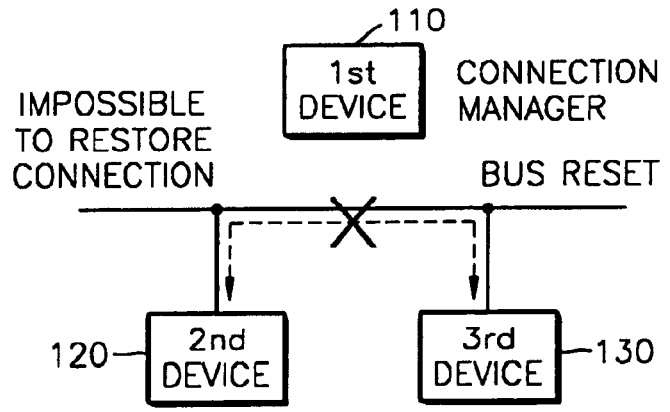
FIG. 2B illustrates a case where a bus reset occurs in a system in which a point-to-point connection is set.
Figure 3:
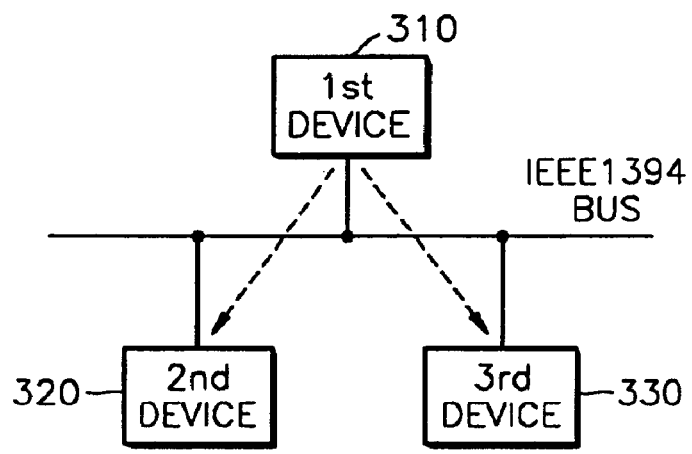
FIG. 3 illustrates a device establishing a point-to-point connection according to the present invention.

First, referring to FIG. 3, a first device 310, a second device 320, and a third device 330 are connected to an IEEE1394 bus, and the first device 310 accesses the iPCR (or oPCR) of the second device 320 and the iPCR (or oPCR) of the third device 330. The first device 310 establishes a point-to-point connection between the second device 320 and the third device 330, by writing appropriate values to the register of the second device 320 and the register of the third device 330.

Figure 4:
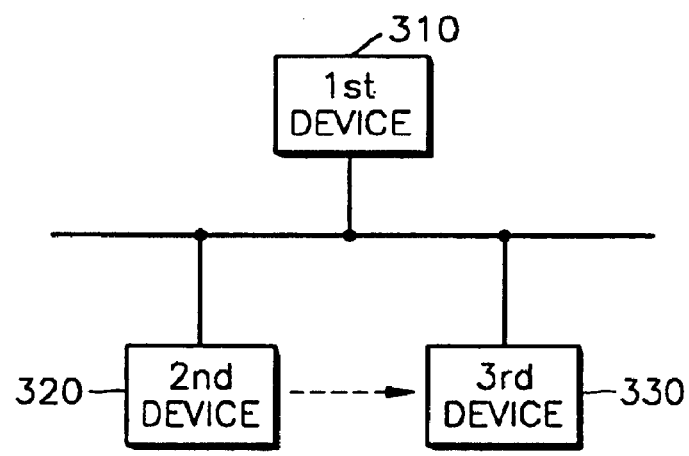
FIG. 4 illustrates overlaying an existing point-to-point connection by establishing a point-to-point connection from a device according to the present invention to another communicating device.
Figure 5:
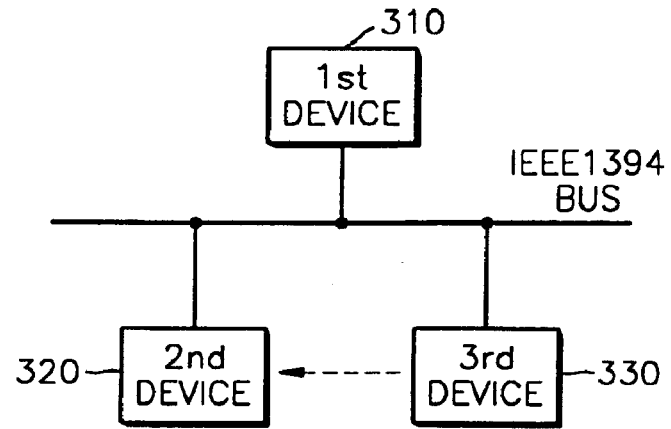
FIG. 5 illustrates overlaying an existing point-to-point connection by establishing a point-to-point connection from a device according to the present invention to another communicating device.

Next, referring to FIGS. 4 and 5, the second device 320 and the third device 330 check the currently established point-to-point connection. Here, when the second device 320 and the third device 330 determine that the first device 310, which manages this connection, is not the other digital device to be connected by this point-to-point connection, they establish a point-to-point connection to each other and overlay the existing connection with the new connection.

Referring to FIG. 4, the second device 320 checks the point-to-point connection and when it determines that the first device 310, which manages this connection, is not the other digital device to be connected by this point-to-point connection, the second device 320 establishes a point-to-point connection to the third device 330, and overlays the existing connection with the new connection.

Referring to FIG. 5, the third device 330 checks the point-to-point connection and when it determines that the first device 310, which manages this connection, is not the other digital device to be connected by this point-to-point connection, the third device 330 establishes a point-to-point connection to the second device 320, and overlays the existing connection with the new connection.

As shown in FIGS. 4 and 5, the newly established point-to-point connection is simply overlaid on the existing point-to-point connection which is previously established as shown in FIG. 3, and therefore, system resources such as channels or bandwidth do not need to be added.

Figure 6:
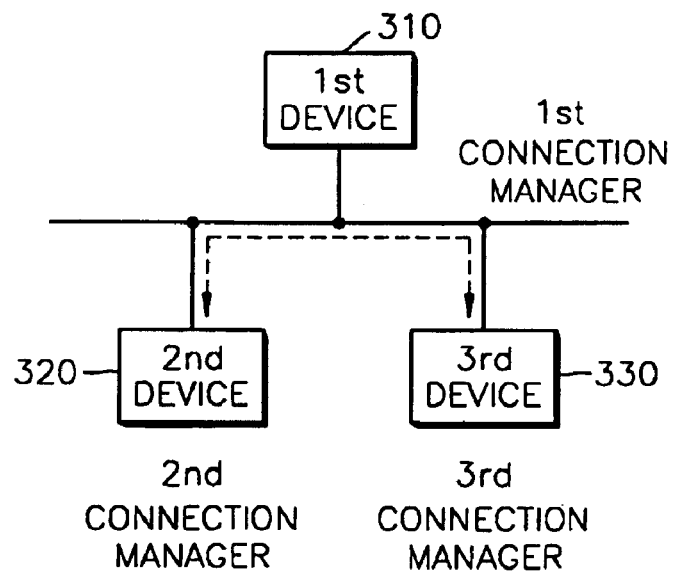
FIG. 6 illustrates the result of point-to-point connection established by overlaying of FIGS. 4 and 5.

As a result, the second device 320 and the third device 330, which are the two devices to be connected by the point-to-point connection, become managers of the point-to-point connection to each other. That is, as shown in FIG. 6, the second device 320 and the third device 330 become the second manager and the third manager, respectively, and a point-to-point connection to each other can be established regardless of the original manager, the first device 310.

Therefore, when a bus reset occurs after a point-to-point connection between the second device 320 and the third device 330 is established, even if the first device operates abnormally or is separated from the connection, the additional point-to-point connection, which is overlaid on the first point-to-point connection, remains.

The present invention is not restricted to the above embodiments, and many variations are possible within the spirit and scope of the present invention. That is, according to the present invention, both of two devices, the second device 320 and the third device 330, can establish a point-to-point connection and overlay the new connection to the existing connection. Also, any one device of the two devices can establish a point-to-point connection and overlay the new connection to the existing connection. In addition, when a point-to-point connection is freed in response to a request from a device, the point-to-point connection can be freed in connection with the freeing of the previous point-to-point connection.

In the meantime, the above-described embodiments of the present invention may be accomplished by a program operable in a computer, and may also be realized in a universal computer executing the program from media used in a computer. The media include storage media such as magnetic storage media (for example, ROMs, floppy disks, hard disks, etc.), optical reading media (for example, CD-ROMs, DVDs, etc), and carrier waves (for example, transmission via the Internet).

As described above, according to the present invention, when the first device does not operate normally or operates in an undesired way after a point-to-point connection between the second device and the third device is established, the connection between the second device and the third device can be stably maintained. In addition, even when the first device does not operate normally or is separated from the connection when a bus reset occurs, an additional point-to-point connection, which is overlaid with respect to the first point-to-point connection, enables the point-to-point connection between the second device and the third device to be stably restored.

What is claimed is:

1. A connection management method for connecting a digital device, which can be connected to a plurality of digital devices through a digital interface, to another digital device, the connection management method comprising the steps of:

(a) detecting a first point-to-point connection being established to another digital device;

(b) checking whether or not the digital device, which establishes the first point-to-point connection in the step (a), is an other digital device to be connected by the first point-to-point connection; and (c) establishing a second point-to-point connection to the other digital device, when the result of the step (b) indicates that the digital device, which establishes the first point-to-point connection, is not the other digital device to be connected by the first point-to-point connection.

2. The connection management method of claim 1, wherein in the step (c), the second point-to-point connection is overlaid with respect to the first point-to-point connection originally established, and managed by the digital device which is connected to the other digital device.

3. The connection management method of claim 2, wherein the second point-to-point connection, which is established in the step (c), is overlaid with respect to the first point-to-point connection by both of, or any one of the other digital device and the another digital devices, which are connected by the first point-to-point connection.

4. The connection management method of claim 1, further comprising:

(d) establishing, via the other digital device, a third point-to-point connection between the digital devices originally being connected, when the result of the step (b) indicates that the device, which establishes the first point-to-point connection in step (a), is not the other digital device to be connected by the first point-to-point connection.

5. A connection management method for connecting a first digital device, which can be connected to a plurality of digital devices through a digital interface, to a second digital device, the connection management method comprising:

(a) detecting, by the first digital device, a first point-to-point connection being established with the first digital device, wherein the first point-to-point connection is established via a connection-establishing digital device, (b) checking whether the connection establishing digital device is the second digital device to be connected to the first digital device by the first point-to-point connection; and (c) establishing, via the first digital device, a second point-to-point connection to the second digital device, when the result of the step (b) indicates that the connection-establishing digital device is not the second digital device to be connected to the first digital device by the first point-to-point connection.

6. The connection management method of claim 5, wherein the step (c), the second point-to-point connection is overlaid with respect to the first point-to-point connection and managed by the first digital device.

7. The connection management method of claim 5, further comprising:

(d) checking, by the second digital device, whether the connection-establishing digital device is the digital device to be connected to the second digital device by the first point-to-point connection; and (e) establishing, via the second digital device, a third point-to-point connection to the first digital device, when the result of the step (d) indicates that the connection-establishing digital device is not the digital device to be connected to the second digital device by the first point-to-point connection.

8. A connection management system for connecting digital devices to each other, comprising:

a digital interface bus;

a first digital device;

a second digital device; and a third digital device;

wherein the first digital device is operable to establish and manage a first point-to-point connection, via the digital interface bus, between other digital devices; and wherein the second digital device is operable to detect whether the first point-to-point connection is being established with the second digital device by the first digital device, and further operable to check whether the first digital device is to be connected to the second digital device by the first point-to-point connection, and further operable to establish a second point-to-point connection between the second digital device and the third digital device, when the first point-to-point connection is being established between the second digital device and the third digital device and the second digital device determines that the first digital device is not to be connected to the second digital device by the first point-to-point connection.

9. The connection management system of claim 8, wherein the second digital device is further operable to overlay the second point-to-point connection, with respect to the first point-to-point connection.

10. The connection management system of claim 8, wherein the third digital device is operable to check whether the first digital device is to be connected to the third digital device by the first point-to-point connection, and further operable to establish a third point-to-point connection between the third digital device and the second digital device, when the first point-to-point connection is being established between the second digital device and the third digital device and the third digital device determines that the first digital device is not to be connected to the third digital device by the first point-to-point connection.

11. The connection management system of claim 8, wherein the digital interface bus is an IEEE 1394 standard serial bus.

12. The connection management method of claim 2, wherein the second point-to-point connection uses at least one of channels or bandwidth existing prior to the establishing of the second point-to-point connection.

13. A connection management method for connecting a first digital device to a second digital device, the connection management method comprising:

(a) establishing a first point-to-point connection by a connection-establishing device, between the first digital device and the second digital device; and (b) establishing a second point-to-point connection by one of the first digital device and the second digital device to another of the first digital device and the second digital device when the connection-establishing device is not determined as being the first digital device or the second digital device.

14. The connection management method of claim 13, wherein the establishing the first point-to-point connection comprises the connection-establishing device writing values to a register of the first digital device and to a register of the second digital device.

15. The connection management method of claim 14, wherein the establishing the second point-to-point connection comprises overlaying on the first point-tot-to-point point connection the second point-to-point connection, wherein at least one of the first digital device and the second digital device manages the second point-to-point connection.

16. The connection management method of claim 15, wherein the second point-to-point connection uses at least one of channels or bandwidth existing prior to the establishing of the second point-to-point connection.

* * * * *